Feb. 3, 1948. M. BERG 2,435,491

MATCH BOOK HOLDER WITH WIND GUARD

Filed Aug. 22, 1944

INVENTOR.
Martin Berg
BY
PATENT AGENT

Patented Feb. 3, 1948

2,435,491

UNITED STATES PATENT OFFICE 2,435,491

MATCH BOOK HOLDER WITH WIND GUARD

Martin Berg, Brooklyn, N. Y.

Application August 22, 1944, Serial No. 550,539

2 Claims. (Cl. 206—35)

This invention relates to improvements in a box containing a match book by providing a wind shield, wherein the usual abrasive face of the match book constitutes at least a part of the walls forming the wind shield. Thus the flame of the ignited match which is started within the shield may be shielded from drafts or air currents during the lighting of an object, such as a cigar, cigarette, pipe, etc.

The main object of the present invention is to provide an article of the above-mentioned character which uses the cover of a box for a match book as one wall and the friction surface of the match book as the other wall of the wind shield, whereby additional walls are arranged, which fold up when the wind shield is in operating position.

A further object of the invention is to provide an article which may be inexpensively manufactured by using mainly existing match books and an existing box for such match books as part of the wind shield.

Another object of the invention is to provide means on the wind shield to insert a lit match within said shield, thus receiving light for the time of burning a match.

A still further object of the invention is to provide shielding means, normally folded to the back of the box containing a match book, but adapted to be unfolded to provide wind shield structure.

With these objects in view, together with others which will appear in the detailed description, the invention resides in the novel formation, combination, and arrangement of parts, as will be described more fully hereafter, illustrated in the drawings, and particularly pointed out in the claims.

There are known many constructions relating to wind shields for match boxes. Most of those boxes are not practical at all because the abrasive surface is outside of the wind shield and before the burning match is inserted into the shield draft or wind will extinguish it. A few suggestions which took this fact into consideration demand a specially arranged abrasive surface within the shield. Considering the fact that match boxes and match books are manufactured and used in millions of pieces it seems of utter importance to provide such a wind shield which uses the box without any change and also the abrasive surface of the match book in order to make the manufacturing process economical and practical.

Figure 1:
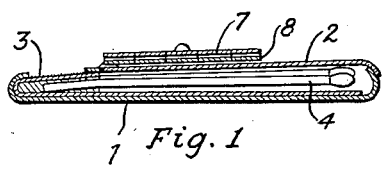
Figure 1 is a sectional view of the box containing a match box, along lines 1—1 of Fig. 3.
Figure 2:
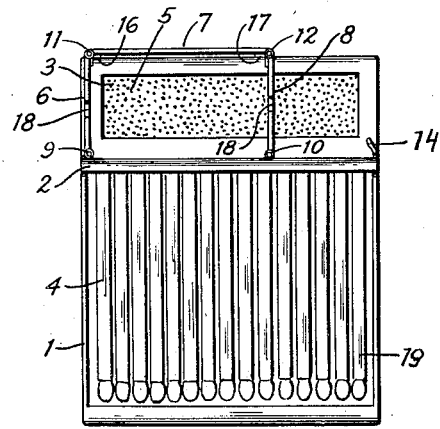
Fig. 2 is a plan view of the article with opened cover of the box and unfolded wind shield.
Figure 3:
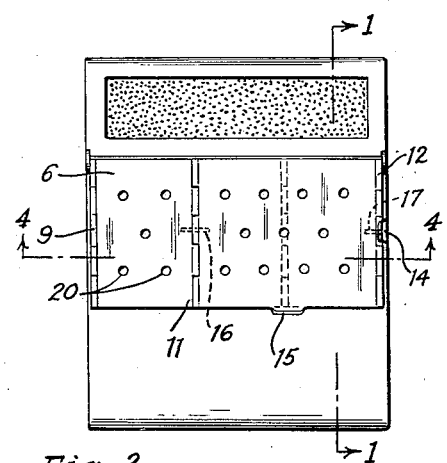
Fig. 3 is a plan view of the article with closed cover and collapsed wind shield.
Figure 4:
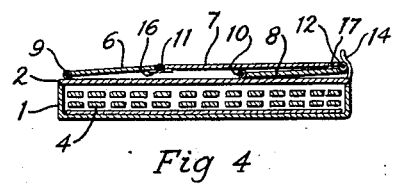
Fig. 4 is a sectional view of the box containing a match book along lines 4—4 of Fig. 3.
Figure 5:
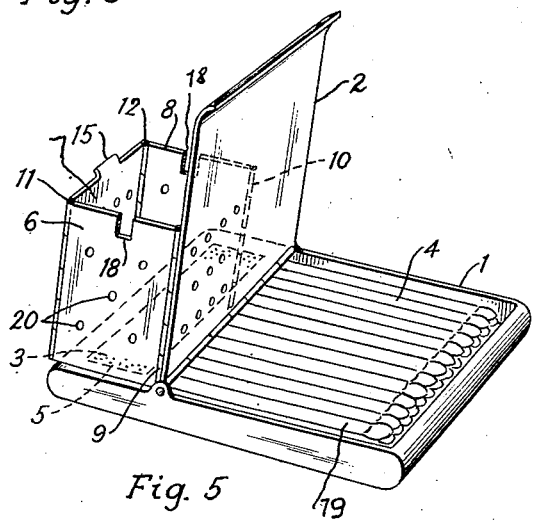
Fig. 5 is a perspective view of the box with open cover and unfolded wind shield.

Referring now more in detail to the accompanying drawings, it will be seen that the article according to the present invention consists of a well known box 1 of about triangular cross section on the top of which is arranged a cover 2. The cover 2 is hinged to the box 1 spaced from its rear end which is provided with a window 3. A conventional match book 4 is inserted into the box 1 in such a way that the abrasive surface 5 of the said match book 4 appears in the window 3 of the box 1.

The preferred embodiment of the wind shield in connection with the described box 1 containing a match book consists of three collapsible walls 6, 7, and 8, which are arranged on the back of the cover 2, which cover 2 forms another wall of the wind shield, whereas the abrasive surface 5 constitutes the bottom of the wind shield. The walls 6 and 8 are fastened to the cover 2 through hinges 9, 10 and extend about vertical to the cover 2 in the unfolded position. The wall 6 is hinged to the cover 2 on the edge of the latter by a hinge 9 whereas the wall 8 is hinged to the cover 2 in a distance to the other edge of the cover 2 which corresponds to the height of the said wall 8, that means when the wall 8 is in the collapsed position its upper end will align with said other edge of the cover 2. Further hinges 11 and 12, arranged on the top of the walls 6 and 8, provide the connection of the said walls 6 and 8 with the wall 7 which extends parallel to the cover 2. The hinge connection 12 between walls 7 and 8 cooperates with a spring 14 arranged on the right edge of the cover 2 to keep the walls 6, 7 and 8 in the collapsed position. Extension 15 on the front of the plate 7 is arranged to pull the walls 6, 7 and 8 into the unfolded position, which is sustained by providing springs 16 and 17 in the hinges 11 and 12, which springs tend to keep the walls 6 and 8, respectively, in an angle of about 90° to the wall 7.

The front ends of the walls 6 and 8 are provided with slots 18 of a width to receive and retain a match 19.

In order to provide sufficient air for a burning match the walls 6, 7 and 8 as well as the cover 2 can be equipped with small holes 20 which are large enough to provide additional air but not large enough to extinguish the burning match by draft or wind.

As stated before, the wind shield is formed as shown in the drawings in its preferred embodiment of five walls, namely the cover 2, the walls 6, 7, and 8, and the bottom, namely the abrasive surface 5, forming a rectangular, collapsible hollow body, having the abrasive surface on its bottom. It is understood that the hollow body can have any polygonal cross section without abandoning the principle of the present invention.

It will be seen that it is very easy to light a match even under unfavorable draft conditions by using the device of the present invention. It is first necessary to pull the extension 15 of the wall 7 in order to put the wind shield into the unfolded position, then the cover 2 is lifted and turned together with the walls 6, 7 and 8 for about 90° thus turning it to the abrasive surface 5 and providing the latter as the bottom of the wind shield.

A match 19 can now be removed from the match book 4 and inserted into the wind shield where the normal lighting of the match 19 can take place. After using the wind shield the cover 2 can be turned down in order to close the box and the walls 6, 7, and 8, being turned with the cover 2, can be collapsed by pressing down to the right the extension 15 of the wall 7 until the extension 13 comes below the spring 14 thus retaining the walls 6, 7, and 8 in the collapsed position. When used as a substitute for a candle the match after being lit is inserted in one of the slots 18 of the walls 6 and 8, respectively, where the match will burn under the protection of the wind shield.

While in the drawings a preferred embodiment is shown as example of my invention, it is to be understood that the invention is not limited thereto, as various changes in the minor details of construction may be provided without departing from the principles of the present invention as defined in the appended claims.

What I claim is:

1. The combination with a box containing a match book having an abrasive face, said box having a hinged cover and a window exposing the abrasive face of said match book, of a shield formed on said cover in operative position and collapsed over said cover in inoperative position, said shield comprising four side walls, said cover forming one of said side walls and said abrasive face forming the bottom of said shield upon lifting the cover of said box.

2. The combination, as set forth in claim 1, in which said shield extends over a portion of said cover in unfolded operative position and two side walls extend over the entire width of said cover in the folded, inoperative position of said shield.

MARTIN BERG.

REFERENCES CITED

The following references are of record in the file of this patent:

UNITED STATES PATENTS

| Number | Name | Date |
|---|---|---|
| 268,638 | De Susini-Ruiseco | Dec. 5, 1882 |
| 1,985,751 | Vogel | Dec. 25, 1934 |
| 1,446,117 | Fuller | Feb. 20, 1923 |
| 726,845 | Behrens | May 5, 1903 |

FOREIGN PATENTS

| Number | Country | Date |
|---|---|---|
| 5,610 | Great Britain | Mar. 18, 1901 |